(12) United States Patent
Liu et al.

(10) Patent No.: US 10,658,851 B2
(45) Date of Patent: May 19, 2020

(54) VEHICLE-MOUNTED CHARGING SYSTEM WITH AC/DC CONVERSION (71) Applicant: HANGZHOU EV-TECH CO., LTD., Hangzhou (CN)

(72) Inventors: Gang Liu, Hangzhou (CN); Zhijiang Deng, Hangzhou (CN)

(73) Assignee: HANGZHOU EV-TECH CO., LTD., Hangzhou (CN)

( * ) Notice: Subject to any disclaimer, the term of this patent is extended or adjusted under 35 U.S.C. 154(b) by 82 days.

(21) Appl. No.: 15/982,140

(22) Filed: May 17, 2018

(65) Prior Publication Data
US 2018/0351374 A1 Dec. 6, 2018

(30) Foreign Application Priority Data

Jun. 1, 2017 (CN) .................. 2017 1 04025622

(51) Int. Cl.
| H02J 7/00 | (2006.01) |
| H01F 27/28 | (2006.01) |
| B60L 1/06 | (2006.01) |
| B60L 50/00 | (2019.01) |
| B60L 55/00 | (2019.01) |
| B60L 53/14 | (2019.01) |
| B60L 1/08 | (2006.01) |
| H02J 7/02 | (2016.01) |
| H02M 1/00 | (2006.01) |
| H02M 7/797 | (2006.01) |

(Continued)

(52) U.S. Cl.
CPC .............. *H02J 7/0024* (2013.01); *B60L 1/06* (2013.01); *B60L 1/08* (2013.01); *B60L 50/00* (2019.02); *B60L 53/14* (2019.02); *B60L 55/00* (2019.02); *H01F 27/28* (2013.01); *H02J 7/0052* (2013.01); *H02J 7/0068* (2013.01); *H02J 7/022* (2013.01); *B60L 2210/14* (2013.01); *B60L 2210/30* (2013.01); *B60L 2240/36* (2013.01); *H02J 2007/0059* (2013.01); *H02M 1/4225* (2013.01); *H02M 3/33584* (2013.01); *H02M 7/797* (2013.01); *H02M 2001/007* (2013.01)

(58) Field of Classification Search
None
See application file for complete search history.

(56) References Cited

U.S. PATENT DOCUMENTS

2013/0325262 A1* 12/2013 Terada .................. B60L 7/16
701/36
2017/0338668 A1* 11/2017 Sada .................. H01M 10/486

* cited by examiner

Primary Examiner — David V Henze-Gongola
(74) Attorney, Agent, or Firm — Hogan Lovells US LLP (57) ABSTRACT A battery charge system includes an on board charge module, a high voltage battery pack unit and a controller. The on board charge module includes a power conversion device, a switching unit coupled to the power conversion device, and an electrothermal element coupled to the switching unit. The power conversion device includes an AC/DC converter and a bidirectional DC/DC converter. The AC/DC converter has an input terminal coupled to an AC terminal, and an output terminal coupled to an input terminal of the bidirectional DC/DC converter. The high voltage battery pack unit includes a first switching element and a high voltage battery pack. The high voltage battery pack is coupled through the first switching element to an output terminal of the bidirectional DC/DC converter. The controller is coupled to the power conversion device and the switching unit, and is configured to control the power conversion device and the switching unit.

15 Claims, 10 Drawing Sheets (51) Int. Cl.
*H02M 1/42* (2007.01)
*H02M 3/335* (2006.01)

VEHICLE-MOUNTED CHARGING SYSTEM WITH AC/DC CONVERSION

RELATED APPLICATIONS

This application claims priority to Chinese Application Serial Number 2017104025622, filed on Jun. 1, 2017 with Chinese Patent Office and entitled "Vehicle-mounted Charging System", the entire contents of which are incorporated herein by reference.

BACKGROUND

In recent years, the EV (electric vehicle) or the PHEV (hybrid electric vehicle) have achieved great improvements in the core technologies and have been gradually entering the stage of practical use and small scale industrialization.

Figure 1A:
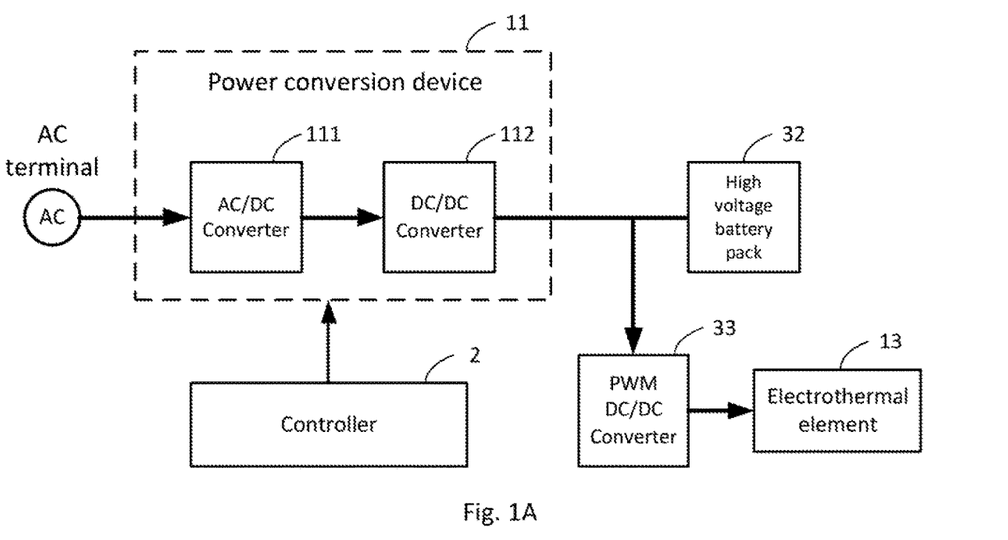
FIG. 1A shows a block diagram of a battery charge system according to one embodiment of the prior art.
Figure 1B:
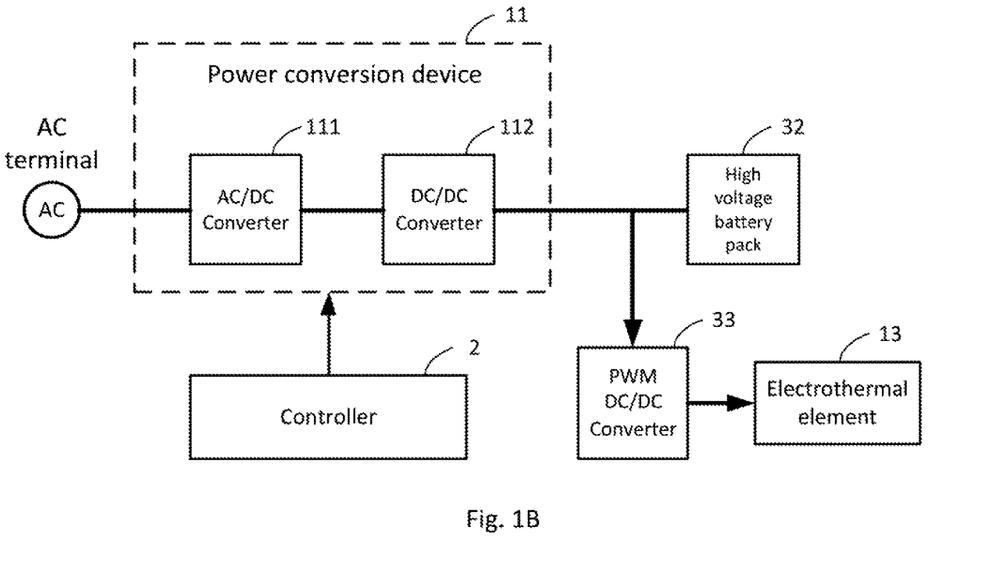
FIG. 1B shows a block diagram of a battery charge system according to one embodiment of the prior art.

Heating is one of the important technologies of the EV (electric vehicle) or the PHEV (hybrid electric vehicle). Under one circumstance, when the temperature is extremely low, the high voltage battery pack needs to be heated firstly before it can be charged. Under another circumstance, the power from the high voltage battery pack is needed to be converted to heat energy to, for example, warm the EV (electric vehicle) or the PHEV (hybrid electric vehicle), defrost or demist. But the heating technologies at present often make the battery charge system bigger volume, higher cost, higher loss and lower efficiency. FIG. 1A and FIG. 1B show a block diagram of a battery charge system according to the prior art. As shown in FIG. 1A, in the preheating mode before the high voltage battery pack 32 can be charged, the power from the alternating current (AC) terminal is transmitted to the electrothermal element 13 by the AC/direct current (DC) converter 111, the DC/DC converter 112, and the PWM DC/DC converter 33, and then the electrothermal element 13 converts the electric power into heat energy to warm the EV or the PHEV. As shown in FIG. 1B, in the temperature conditioning mode, the power from the high voltage battery pack 32 is transmitted to the electrothermal element 13 by the PWM DC/DC converter 33, and then the electrothermal element 13 converts the electric power into heat energy to condition the temperature of the EV or the PHEV. So there needs an additional special PWM DC/DC converter and a controller correspondingly to control it to output the electric power to the electrothermal element 13, which makes the battery charge system bigger volume, higher cost, higher loss and lower efficiency.

So there is a need to provide a new heating technology to make a smaller volume, lower cost, lower loss and higher efficiency battery charge system.

SUMMARY OF THE DISCLOSURE

An object of the present disclosure provides a battery charge system. The battery charge system includes an on board charge module, a high voltage battery pack unit and a controller. The on board charge module includes a power conversion device, a switching unit and an electrothermal element. The power conversion device includes an AC/DC converter and a bidirectional DC/DC converter, an input terminal of the AC/DC converter is coupled to an AC terminal, and an output terminal of the AC/DC converter is coupled to an input terminal of the bidirectional DC/DC converter. The switching unit is coupled to the power conversion device. The electrothermal element is coupled to the switching unit. The high voltage battery pack unit includes a first switching element and a high voltage battery pack, the high voltage battery pack is coupled through the first switching element to an output terminal of the bidirectional DC/DC converter. The controller is coupled to the power conversion device and the switching unit, and is configured to control the power conversion device and the switching unit.

Further, the AC/DC converter comprises a bidirectional AC/DC converter or a unidirectional AC/DC converter.

Numerous benefits are achieved by way of the present invention over conventional techniques. For example, one embodiment of the present disclosure provides a battery charge system in the preheating mode, the temperature conditioning mode and the charging mode, only the power conversion device in the on board charge module are needed. That is, less converter is needed in the transmission path, so lower loss and higher efficiency battery charge system is achieved.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically depicted in order to simplify the drawings.

Figure 2:
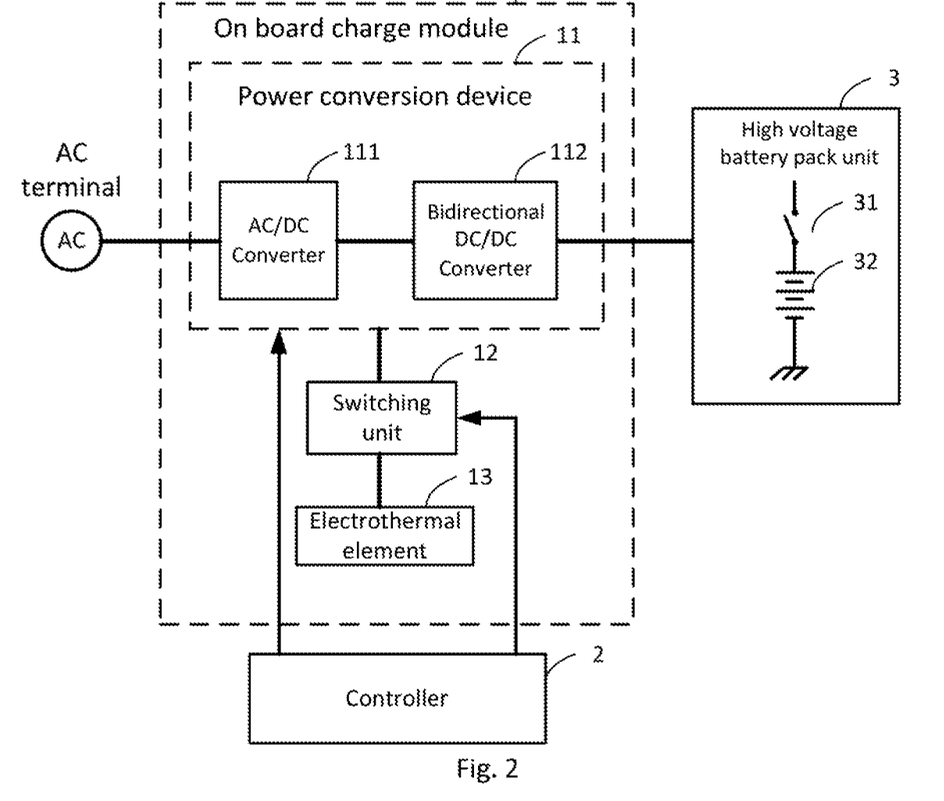
FIG. 2 shows a block diagram of a battery charge system according to one embodiment of this disclosure.

FIG. 2 shows a block diagram of a battery charge system according to one embodiment of this disclosure. The battery charge system includes an on board charge module 1, a controller 2, and a high voltage battery pack unit 3. The first terminal of the on board charge module 1 is coupled to an AC terminal, and the second terminal of the on board charge module 1 is coupled to the high voltage battery pack unit 3. Specifically, the second terminal of the on board charge module 1 is coupled through a first switching element 31 to a high voltage battery pack 32, that is, the high voltage battery pack 32 and the first switching element 31 is configured into the high voltage battery pack unit 3. The controller 2 is coupled to the on board charge module 1, and control the on board charge module 1.

The on board charge module 1 includes a power conversion device 11, a switching unit 12 and an electrothermal element 13. The switching unit 12 is coupled to the power conversion device 11, and the electrothermal element 13 is coupled to the switching unit 12. The power conversion device 11 includes an AC/DC converter 111 and a bidirectional DC/DC converter 112. The input terminal of the AC/DC converter 111 is coupled to the AC terminal, and the output terminal of the AC/DC converter 111 is coupled to the input terminal of the bidirectional DC/DC converter 112, the high voltage battery pack 32 is coupled through the first switching element 31 to the output terminal of the bidirectional DC/DC converter 112. Specially, the controller 2 is coupled to the power conversion device 11 and the switching unit 12. and is configured to control the power conversion device 11 and the switching unit 12.

When the high voltage battery pack 32 can't be charged under extremely low temperature, the on board charge module 1 works in the preheating mode by controlling the power conversion device 11 and the switching unit 12 through the controller 2, so that the high voltage pack 32 in the EV or the PHEV is heated in the meantime that the EV or the PHEV is heated by the on board charge module 1. When the EV or the PHEV is in operation or under low temperature, the on board charge module 1 works in the temperature conditioning mode by controlling the power conversion device 11 and the switching unit 12 through the controller 2, so that the temperature of the EV or the PHEV is conditioned by the on board charge module 1. Of course, the on board charge module 1 can works in the charging mode or the inversion mode, or other mode as actual application.

In one embodiment, in the preheating mode, the controller 2 controls the first switching element 31 to be off, and the switching unit 12 to be on. And, the controller 2 controls the power conversion device 11 to transform the power from the AC terminal to an output power, the electrothermal element 13 receives the output power and converts the output power into heat energy to warm the EV or the PHEV. In the temperature conditioning mode, the controller 2 controls both the first switching element 31 and the switching unit 12 to be on. And, the controller 2 controls the power conversion device 11 to transform the power from the high voltage battery pack 32 to an output power, the electrothermal element 13 receives the output power and converts the output power into heat energy to condition the temperature of the EV or the PHEV. In the charging mode, the controller 2 controls the first switching element 31 to be on, and the switching unit 12 off. And, the controller 2 controls the power conversion device 11 to transform the power from AC terminal to an output power to charge the high voltage battery pack 32. That is, in one embodiment, the controller 2 comprises the control means in the battery charge system to output control signals to the battery charge system and the control means in the EV or the PHEV to output control signals to the components (for example, output a control signal to control the first switching element 31) in the EV or the PHEV.

In general, in the preheating mode and in the temperature conditioning mode, the controller 2 controls the switching unit 12 to be on, so that the electrothermal element 13 is coupled to the power conversion device 11 through the switching unit 12, and, converts the output power from the power conversion device 11 into heat energy to warm the EV or the PHEV or to condition the temperature of the EV or the PHEV. Therefore, in the embodiment, as shown in FIG. 2, the on board charge module 1 just needs to add the switching unit 12, and by controlling the switching unit 12 to be on or off, the electrothermal element 13 is coupled into the on board charge module 1 or cut off from the on board charge module 1. And, when the electrothermal element 13 is coupled to the on board charge module 1, it is only need to control the power conversion device 11 to output the output power to the electrothermal element 13, it doesn't need an additional special DC\DC converter and a controller correspondingly to control the additional special DC\DC converter to output the output power to the electrothermal element 13. As a result, a smaller volume, lower cost, lower loss and higher efficiency battery charge system is achieved.

Figure 3A:
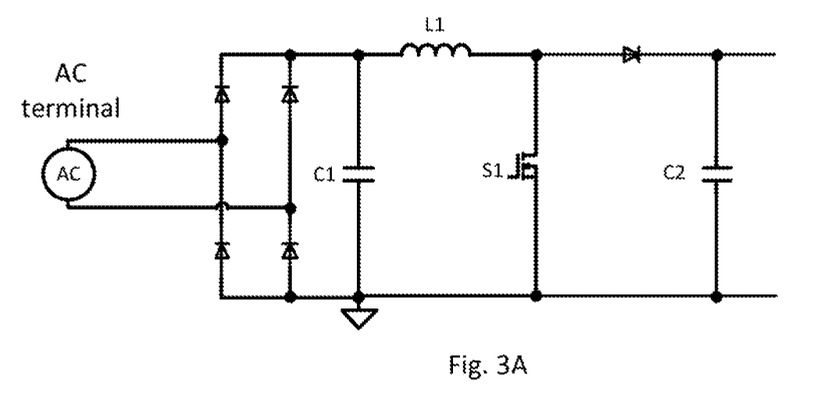
FIG. 3A shows a schematic diagram of an AC/DC converter according to one embodiment of this disclosure.
Figure 3B:
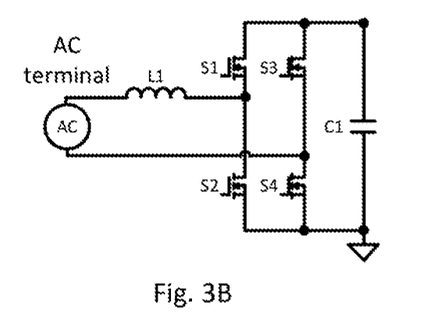
FIG. 3B shows a schematic diagram of an AC/DC converter according to another embodiment of this disclosure.
Figure 3C:
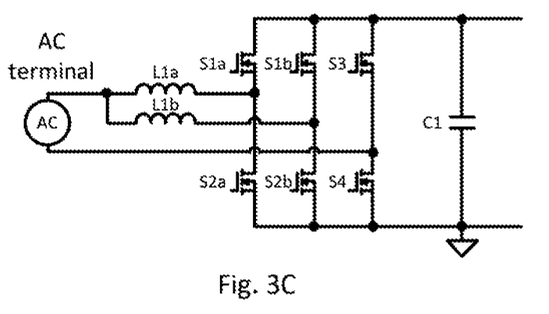
FIG. 3C shows a schematic diagram of an AC/DC converter according to another embodiment of this disclosure.

In one embodiment, the AC/DC convert in the power conversion device 11 can be a unidirectional converter as shown in FIG. 3A or a bi-directional converter as shown in FIG. 3B and FIG. 3C. As shown in FIG. 3A, the unidirectional AC/DC converter includes a bridge rectifier and a Boost PFC. As shown in FIG. 3B, the bi-directional AC/DC converter includes a controllable bridge rectifier circuit which includes two bridge arms. As shown in FIG. 3C, the bi-directional AC/DC converter includes a controllable bridge rectifier circuit which includes three bridge arms. Embodiments of this disclosure are not limited thereto. People having ordinary skill in the art choose other AC/DC topology according to their actual application.

Figure 4A:
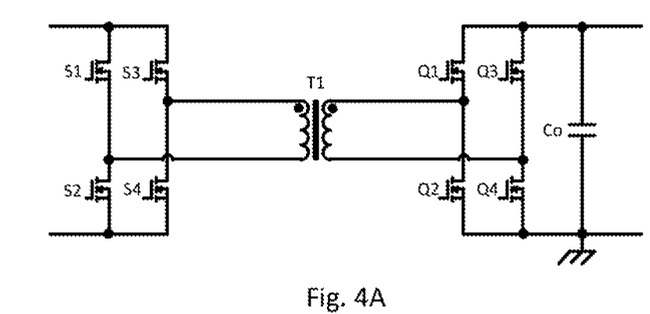
FIG. 4A shows a schematic diagram of a bi-directional DC/DC converter according to one embodiment of this disclosure.
Figure 4B:
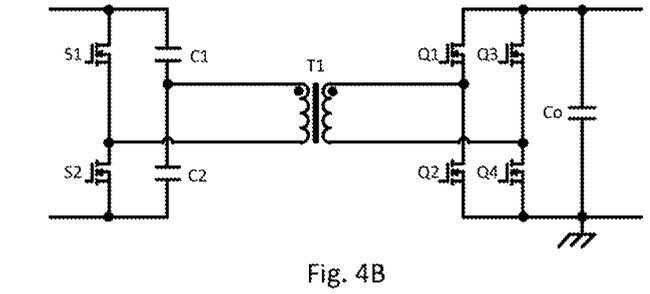
FIG. 4B shows a schematic diagram of a bi-directional DC/DC converter according to another embodiment of this disclosure.

In one embodiment, the bidirectional DC/DC converter 112 in the power conversion device 11 can be a full-bridge circuit as shown in FIG. 4A or a half-bridge circuit as shown in FIG. 4B. Embodiments of this disclosure are not limited thereto. People having ordinary skill in the art can choose other bidirectional DC/DC topology to realize bidirectional conversion according to their actual application.

Specially, in one embodiment, the power conversion device 11 can not only include a two-stage power converter which includes an AC/DC converter and a bidirectional DC/DC converter 112, the power conversion device 11 can further include a third converter to form a three-stage power converter. Embodiments of this disclosure are not limited thereto. People having ordinary skill in the art can design the power conversion device 11 according to their actual application.

Below, the operation principle of an embodiment of this disclosure is illustrated taking the power conversion device 11 that includes the bidirectional AC/DC converter 111 as shown in FIG. 3B and the bidirectional DC/DC converter 112 as shown in FIG. 4A as example.

Figure 5:
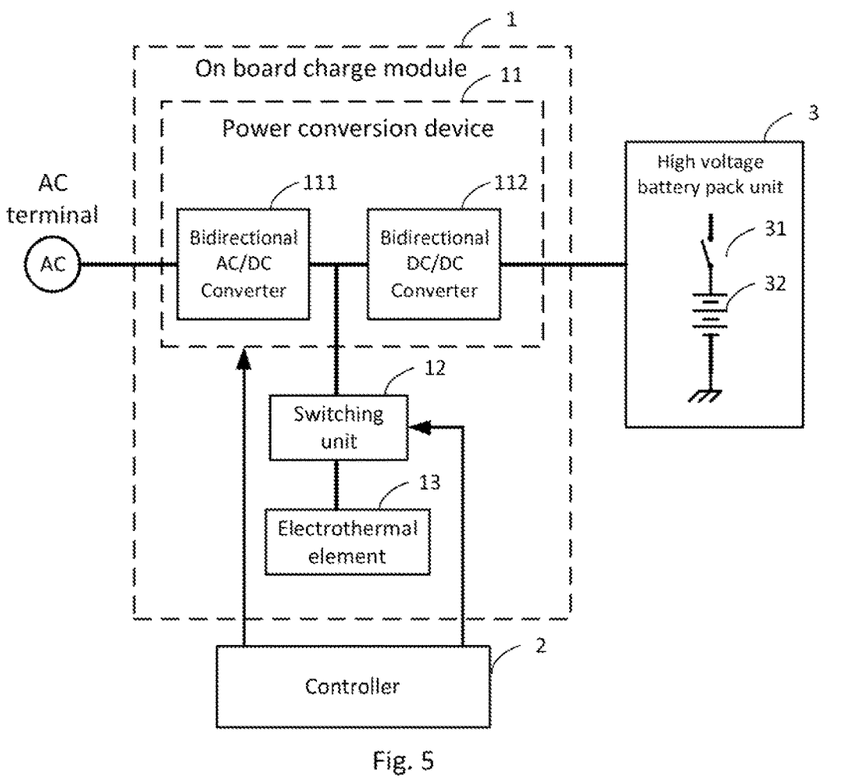
FIG. 5 shows a block diagram of a battery charge system according to one embodiment of this disclosure.

FIG. 5 shows a block diagram of a battery charge system according to one embodiment of this disclosure. As shown in FIG. 5, the switching unit 12 is coupled to the output terminal of the bidirectional AC/DC converter 111.

In one embodiment, in the preheating mode, the controller 2 controls the first switching element 31 to be off, and the switching unit 12 on. And, the controller 2 controls the bidirectional AC/DC converter 111 to transform the power from the AC terminal to an output power, the electrothermal element 13 receives the output power and converts the output power into heat energy to warm the EV or the PHEV. In the temperature conditioning mode, the controller 2 controls both the first switching element 31 and the switching unit 12 to be on. And, the controller 2 controls the bidirectional DC/DC converter 112 to transform the power from the high voltage battery pack 32 to an output power, the electrothermal element 13 receives the output power and converts the output power into heat energy to condition the temperature of the EV or the PHEV. In the charging mode, the controller 2 controls the first switching element 31 to be on, and the switching unit 12 to be off. And, the controller 2 controls the bidirectional AC/DC converter 111 and the bidirectional DC/DC converter 112 to transform the power from the AC terminal to an output power to charge the high voltage battery pack 32.

In the embodiment as shown in FIG. 5, in the preheating mode, the power from the AC terminal is transmitted to the electrothermal element 13 by the bidirectional AC/DC converter 111. In the temperature conditioning mode, the power from the high voltage battery pack 32 is transmitted to the electrothermal element 13 by the bidirectional DC/DC converter 112. That is, less converter is needed in the transmission path, so lower loss and higher efficiency battery charge system is achieved. And as shown in the embodiment, it doesn't need an additional special WPM DC/DC converter and a controller correspondingly to control it. so reducing the cost of the battery charge system significantly and making the design of the battery charge system easier.

Figure 6A:
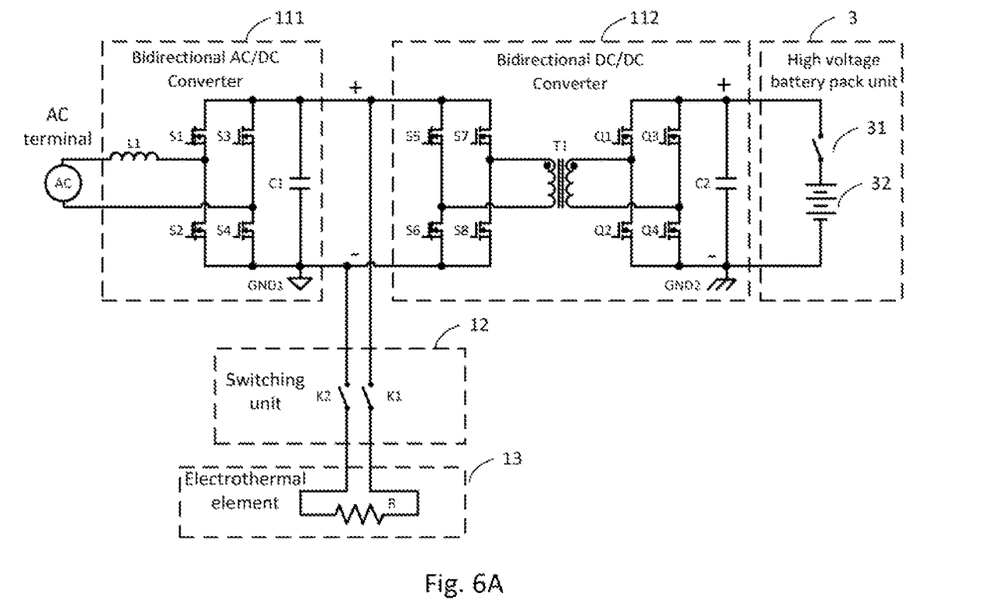
FIG. 6A shows a schematic diagram of a battery charge system shown in FIG. 5 according to one embodiment of this disclosure.

FIG. 6A shows a schematic diagram of a battery charge system shown in FIG. 5 according to one embodiment of this disclosure. As shown in FIG. 6A, the switching unit 12 includes a first input terminal, a first output terminal, a second input terminal, and a second output terminal, and the switching unit 12 includes a first relay K1 and a second relay K2. Specially, the first terminal of the first relay K1 is coupled to the first input terminal of the switching unit 12, the second terminal of the first relay K1 is coupled to the first output terminal of the switching unit 12, the first terminal of the second relay K2 is coupled to the second input terminal of the switching unit 12, the second terminal of the second relay K2 is coupled to the second output terminal of the switching unit 12. The first input terminal and the second input terminal are coupled to the positive output terminal and the negative output terminal of the bidirectional AC/DC converter 111 respectively. The first output terminal and the second output terminal are coupled to the first terminal and the second terminal of the electrothermal element 13 respectively. Specially, the electrothermal element 13 includes at least a power resistor R, for example a PTC (positive temperature coefficient) power resistor R.

In one embodiment, in the preheating mode, the controller 2 controls the first relay K1 and the second relay K2 to be on, so that The electrothermal element 13 is coupled to the power conversion device 11 through The first relay K1 and the second relay K2, and by controlling the bidirectional AC/DC converter 111, the power from the AC terminal is transmitted to the electrothermal element 13 through the bidirectional AC/DC converter 111 to make The electrothermal element 13 generate heat energy to warm the EV or the PHEV.

In one embodiment, in the temperature conditioning mode, the controller 2 controls the first relay K1 and the second relay K2 to be on, so that the electrothermal element 13 is coupled to the power conversion device 11 through the first relay K1 and the second relay K2. and by controlling by the bidirectional DC/DC converter 112, the power from the high voltage battery pack 32 is transmitted to the electrothermal element 13 through the bidirectional DC/DC converter 112 to make the electrothermal element 13 generate heat energy to condition the temperature of the EV or the PHEV.

In one embodiment, in the charging mode, the controller 2 controls the first relay K1 and the second relay K2 to be off, so that the electrothermal element 13 is cut off from the on board charge module 1, the controller 2 controls the bidirectional AC/DC converter 111 and the bidirectional DC/DC converter 112 to transform the power from AC terminal to an output power to charge the high voltage battery pack 32.

Figure 6B:
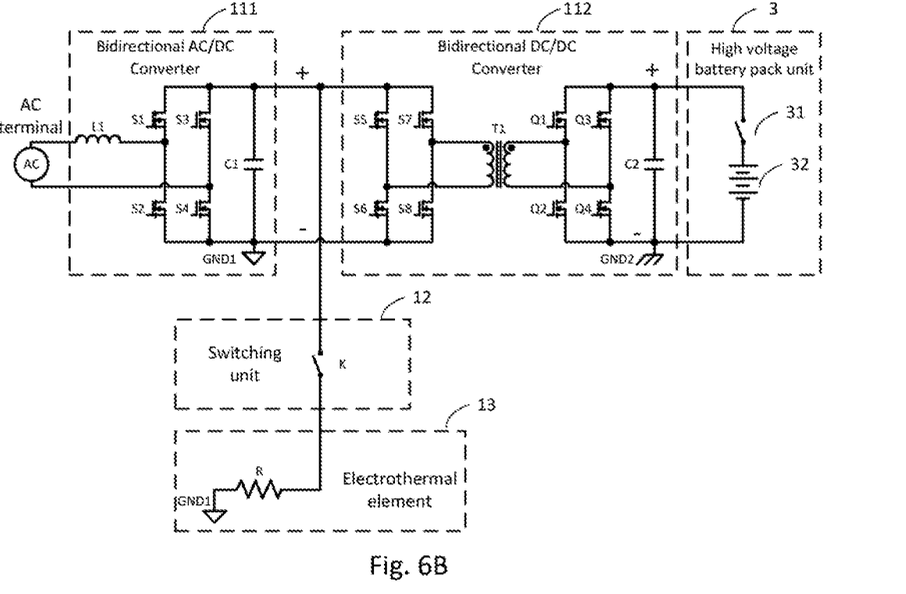
FIG. 6B shows a schematic diagram of a battery charge system shown in FIG. 5 according to one embodiment of this disclosure.

FIG. 6B shows a schematic diagram of a battery charge system shown in FIG. 5 according to one embodiment of this disclosure. as shown in FIG. 6B, the switching unit 12 includes an input terminal, an output terminal and a relay K. Specially, the relay K is coupled between the input terminal and the output terminal, the input terminal is coupled to the positive output terminal of the bidirectional AC/DC converter 111. The electrothermal element 13 includes a power resister R, the output terminal of the switching unit 12 is coupled to the first terminal of the power resistor R, and the second terminal of the power resistor R is coupled to the first ground GND1 of the power conversion device 11. And more specially, the first ground GND1 is the primary ground of the bidirectional DC/DC converter 112.

In one embodiment, in the preheating mode, the controller 2 controls the relay K to be on, so that the power resistor R is coupled to the power conversion device 11 through the relay K, and by controlling the bidirectional AC/DC converter 111, the power from the AC terminal is transmitted to the power resistor R through the bidirectional AC/DC converter 111 to make the power resistor R generate heat energy to warm the EV or the PHEV.

In one embodiment, in the temperature conditioning mode, the controller 2 controls the relay K to be on, so that the power resistor R is coupled to the power conversion device 11 through the relay K, and by controlling the bidirectional DC/DC converter 112, the power from the high voltage battery pack 32 is transmitted to the power resistor R through the bidirectional DC/DC converter 112 to make the power resistor R generate heat energy to condition the temperature of the EV or the PHEV.

In one embodiment, in the charging mode, the controller 2 controls the relay K to be off, so that the electrothermal element 13 is cut off from the on board charge module 1, the controller 2 controls the bidirectional AC/DC converter 111 and the bidirectional DC/DC converter 112 to transform the power from AC terminal to an output power to charge the high voltage battery pack 32.

Figure 7:
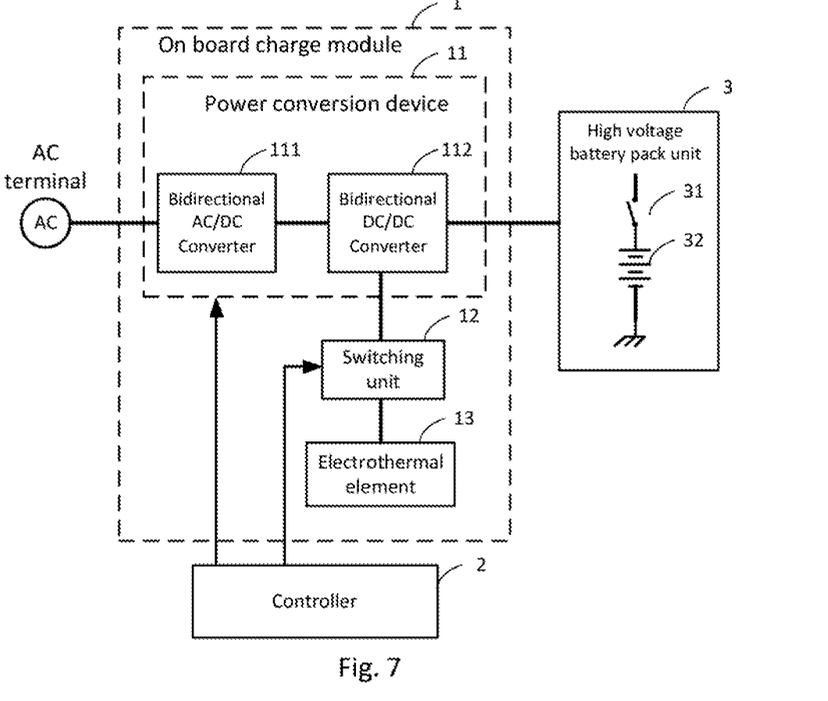
FIG. 7 shows a block diagram of a battery charge system according to one embodiment of this disclosure.

FIG. 7 shows a block diagram of a battery charge system according to one embodiment of this disclosure. As shown in FIG. 7, the switching unit 12 is coupled the bidirectional DC/DC converter 112.

In one embodiment, in the preheating mode, the controller 2 controls the first switching element 31 to be off, and the switching unit 12 on. And, the controller 2 controls the bidirectional AC/DC converter 111 and the bidirectional DC/DC converter 112 to transform the power from the AC terminal to an output power, the electrothermal element 13 receives the output power and converts the output power into heat energy to warm the EV or the PHEV. In the temperature conditioning mode, the controller 2 controls both the first switching element 31 and the switching unit 12 to be on. And, the controller 2 controls the bidirectional DC/DC converter 112 to transform the power from the high voltage battery pack 32 to an output power, the electrothermal element 13 receives the output power and converts the output power into heat energy to condition the temperature of the EV or the PHEV. In the charging mode, the controller 2 controls the first switching element 31 to be on, and the switching unit 12 to be off. And, the controller 2 controls the bidirectional AC/DC converter 111 and the bidirectional DC/DC converter 112 to transform the power from AC terminal to an output power to charge the high voltage battery pack 32.

In the embodiment as shown in FIG. 7, in the preheating mode, the power from the AC terminal is transmitted to the electrothermal element 13 by the bidirectional AC/DC converter 111 and bidirectional DC/DC converter 112. In the temperature conditioning mode, the power from the high voltage battery pack 32 is transmitted to the electrothermal element 13 by the bidirectional DC/DC converter 112. That is, less converter in needed in the transmission path, so lower loss and higher efficiency battery charge system is achieved. And as shown in the embodiment, it doesn't need an additional special PWM DC/DC converter and a controller correspondingly to control it, so reducing the cost of the battery charge system significantly and making the design of the battery charge system easier.

Figure 8A:
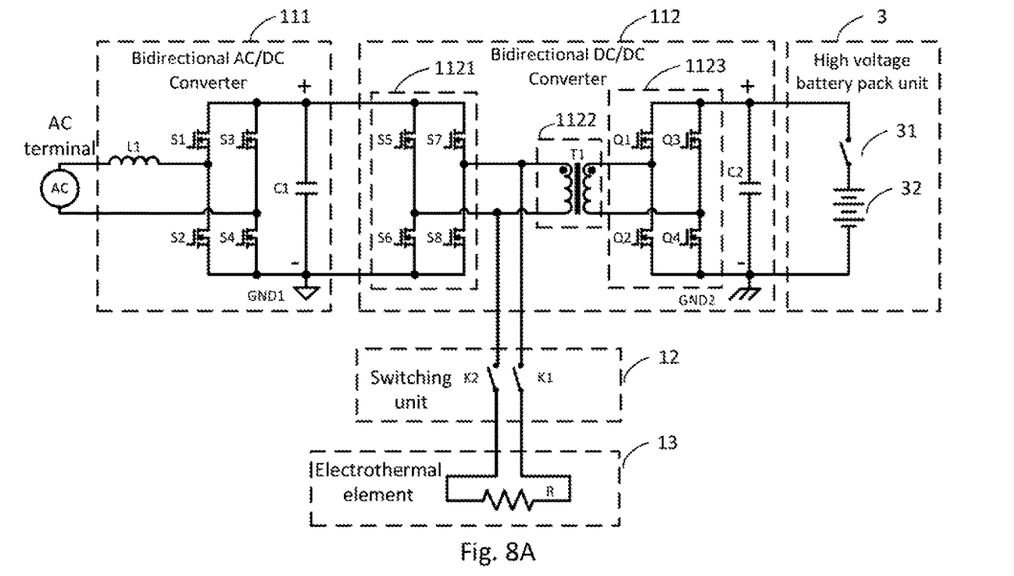
FIG. 8A shows a schematic diagram of a battery charge system shown in FIG. 7 according to one embodiment of this disclosure.

FIG. 8A shows a schematic diagram of a battery charge system shown in FIG. 7 according to one embodiment of this disclosure. As shown in FIG. 8A, the bidirectional DC/DC converter 112 includes a primary switching unit 1121, a transformer 1122, and a secondary switching unit 1123, the primary switching unit 1121 is coupled between the output terminal of the bidirectional AC/DC converter 111 and the two terminals of primary winding of the transformer 1122, the secondary switching unit 1123 is coupled between the high battery pack unit and the two terminals of secondary winding of the transformer 1122.

Specially, the first input terminal of the switching unit 12 is coupled to the first terminal of the primary winding of the transformer 1122, the first output terminal of the switching unit 12 is coupled to the first terminal of the electrothermal element 13, the second input terminal of the switching unit 12 is coupled to the second terminal of the primary winding of the transformer 1122, the second output terminal of the switching unit 12 is coupled to the second terminal of the electrothermal element 13, the first relay K1 is coupled between the first input terminal of the switching unit 12 and the first output terminal of the switching unit 12, the second relay K2 is coupled between the second input terminal of the switching unit 12 and the second output terminal of the switching unit 12.

In one embodiment, in the preheating mode, the controller 2 controls the first relay K1 and the second relay K2 to be on, so that the electrothermal element 13 is coupled to the power conversion device 11 through the first relay K1 and the second relay K2, and by controlling the bidirectional AC/DC converter 111 and the primary switching unit 1121, the power from the AC terminal is transmitted to the electrothermal element 13 through the bidirectional AC/DC converter 111 and the primary switching unit 1121 to make the electrothermal element 13 generate heat energy to warm the EV or the PHEV.

In one embodiment, in the temperature conditioning mode, the controller 2 controls the first relay K1 and the second relay K2 to be on, so that the electrothermal element 13 is coupled to the power conversion device 11 through the relay K1 and the second relay K2, and by controlling the secondary switching unit 1123 and the transformer 1122, the power from the high voltage battery pack 32 is transmitted to the electrothermal element 13 through the secondary switching unit 1123 and the transformer 1122 to make the electrothermal element 13 generate heat energy to condition the temperature of the EV or the PHEV.

In one embodiment, in the charging mode, the controller 2 controls the first relay K1 and second relay K2 to be off, so that the electrothermal element 13 is cut off from the on board charge module 1, the controller 2 controls the bidirectional AC/DC converter 111 and the bidirectional DC/DC converter 112 to transform the power from AC terminal to an output power to charge the high voltage battery pack 32.

Figure 8B:
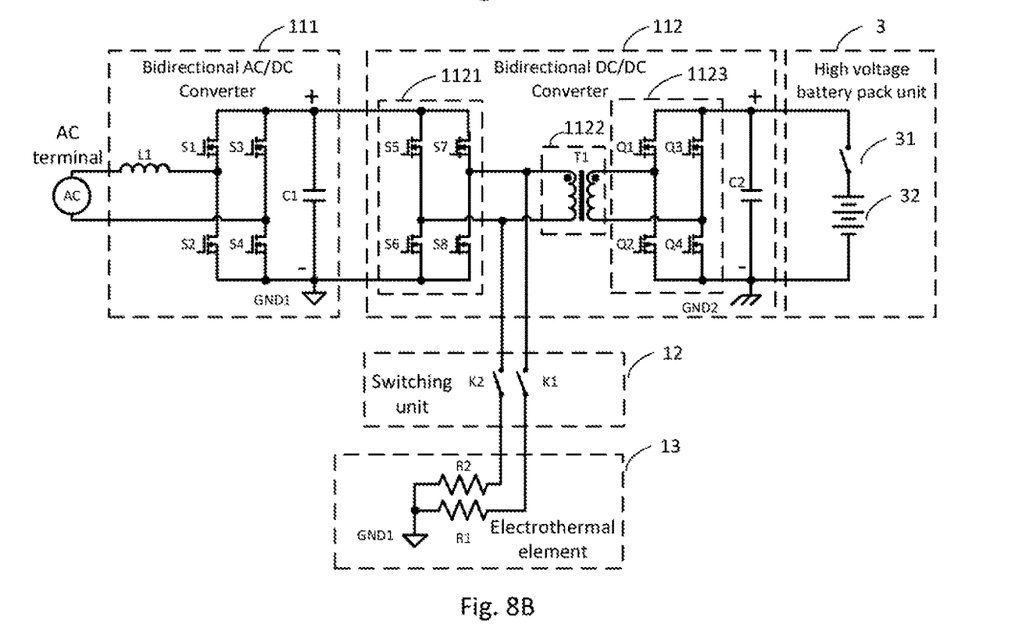
FIG. 8B shows a schematic diagram of a battery charge system shown in FIG. 7 according to another embodiment of this disclosure.

FIG. 8B shows a schematic diagram of a battery charge system shown in FIG. 7 according to one embodiment of this disclosure. As shown in FIG. 8B, the differences with FIG. 8A are: The electrothermal element 13 includes a first power resistor R1 and a second power resistor R2, the first output terminal of the switching unit 12 is coupled to the first terminal of the first power resistor R1, and the second terminal of the first power resistor R1 is coupled to the first ground GND1 of the power conversion device 11, the second output terminal of the switching unit 12 is coupled to the first terminal of the second power resistor R2, and the second terminal of the second power resistor R2 is coupled to the first ground GND1 of the power conversion device 11.

In one embodiment, in the preheating mode, the controller 2 controls the first relay K1 and the second relay K2 to be on, so that the first power resistor R1 and the second power resistor R2 are coupled to the power conversion device 11 through the first relay K1 and the second relay K2, and by controlling the bidirectional AC/DC converter 111 and the primary switching unit 1121, the power from the AC terminal is transmitted to the first power resistor R1 and the second power resistor R2 through the bidirectional AC/DC converter 111 and the primary switching unit 1121 to make the first power resistor R1 and the second power resistor R2 generate heat energy to warm the EV or the PHEV.

In one embodiment, in the temperature conditioning mode, the controller 2 controls the first relay K1 and the second relay K2 to be on, so that the first power resistor R1 and the second power resistor R2 are coupled to the power conversion device 11 through the first relay K1 and the second relay K2, and by controlling the secondary switching unit 1123 and the transformer 1122, the power from the high voltage battery pack 32 is transmitted to the first power resistor R1 and the second power resistor R2 through the secondary switching unit 1123 and the transformer 1122 to make the first power resistor R1 and the second power resistor R2 generate heat energy to condition the temperature of the EV or the PHEV.

In one embodiment, in the charging mode, the controller 2 control the first relay K1 and the second relay K2 to be off, so that the first power resistor R1 and the second power resistor R2 are cut off from the on board charge module 1, the controller 2 controls the bidirectional AC/DC converter 111 and the bidirectional DC/DC converter 112 to transform the power from the AC terminal to an output power to charge the high voltage battery pack 32.

Figure 9A:
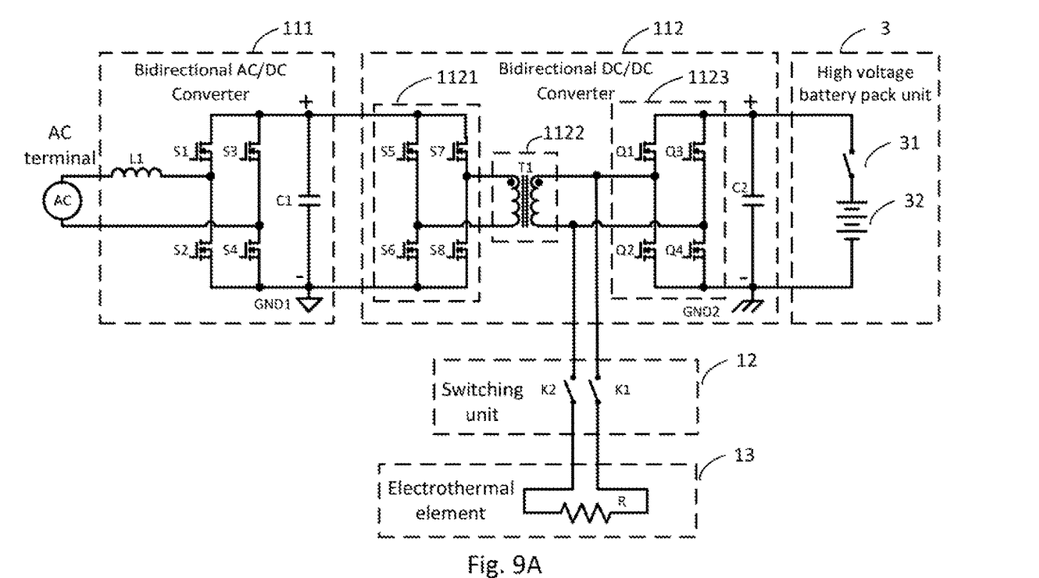
FIG. 9A shows a schematic diagram of a battery charge system shown in FIG. 7 according to one embodiment of this disclosure.

FIG. 9A shows a schematic diagram of a battery charge system shown in FIG. 7 according to one embodiment of this disclosure. As shown in FIG. 9A, the differences with FIG. 8A are: the first input terminal of the switching unit 12 is coupled to the first terminal of the secondary winding of the transformer 1122, and the second input terminal of the switching unit 12 is coupled to the second terminal of the secondary winding of the transformer 1122.

In one embodiment, in the preheating mode, the controller 2 controls the first relay K1 and the second relay K2 to be on, so that The electrothermal element 13 is coupled to the power conversion device 11 through The first relay K1 and the second relay K2, and by controlling the bidirectional AC/DC converter 111, the primary switching unit 1121 and the transformer 1122, the power from the AC terminal is transmitted to the electrothermal element 13 through the bidirectional AC/DC converter 111, the primary switching unit 1121 and the transformer 1122 to make the electrothermal element 13 generate heat energy to warm the EV or the PHEV.

In one embodiment, in the temperature conditioning mode, the controller 2 controls the first relay K1 and the second relay K2 to be on, so that The electrothermal element 13 is coupled to the power conversion device 11 through the first relay K1 and the second relay K2, and by controlling the secondary switching unit 1123, the power from the high voltage battery pack 32 is transmitted to the electrothermal element 13 through the secondary switching unit 1123 to make the electrothermal element 13 generate heat energy to condition the temperature of the EV or the PHEV.

In one embodiment, in the charging mode, the controller 2 controls the first relay K1 and second relay K2 to be off, so that the electrothermal element 13 is cut off from the on board charge module 1, the controller 2 controls the bidirectional AC/DC converter 111 and the bidirectional DC/DC converter 112 to transform the power from AC terminal to an output power to charge the high voltage battery pack 32.

Figure 9B:
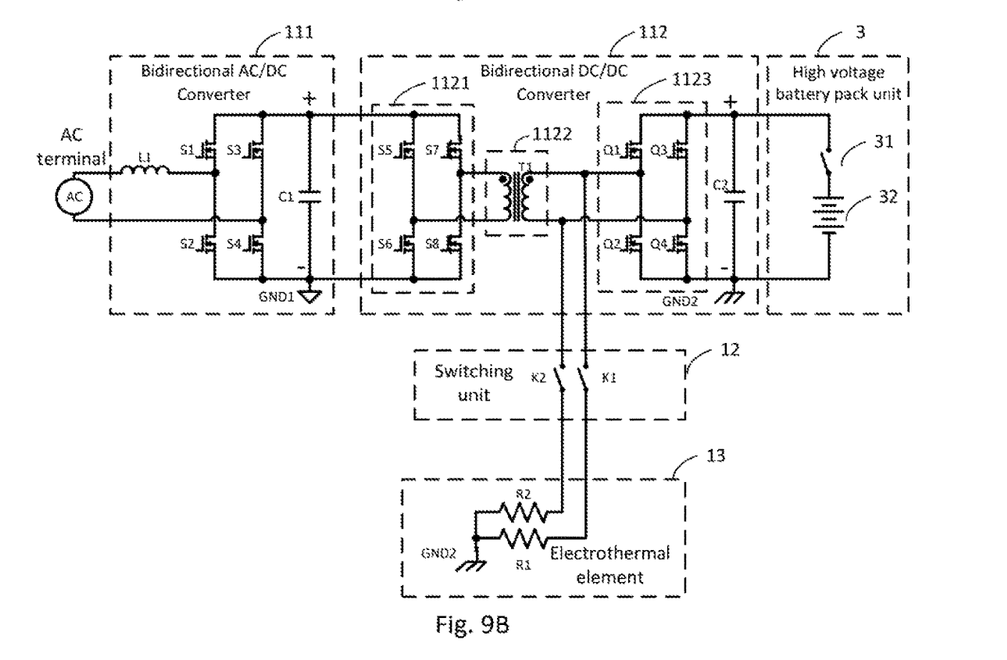
FIG. 9B shows a schematic diagram of a battery charge system shown in FIG. 7 according to another embodiment of this disclosure.

FIG. 9B shows a schematic diagram of a battery charge system shown in FIG. 7 according to one embodiment of this disclosure. As shown in FIG. 9B, the differences with FIG. 8B are: The first input terminal of the switching unit 12 is coupled to the first terminal of the secondary winding of the transformer 1122, the second input terminal of the switching unit 12 is coupled to the second terminal of the secondary winding of the transformer 1122. the first output terminal of the switching unit 12 is coupled to the first terminal of the first power resistor R1, and the second terminal of the first power resistor R1 is coupled to the second ground GND2 of the power conversion device 11, the second output terminal of the switching unit 12 is coupled to the first terminal of the second power resistor R2, and the second terminal of the second power resistor R2 is coupled to the second ground GND2 of the power conversion device 11. And more specially, the second ground GND2 is the secondary ground of bidirectional DC/DC converter 112.

In one embodiment, in the preheating mode, the controller 2 controls the first relay K1 and the second relay K2 to be on. so that the first power resistor R1 and the second power resistor R2 are coupled to the power conversion device 11 through the first relay K1 and the second relay K2, and by controlling the bidirectional AC/DC converter 111, the primary switching unit 1121 and the transformer 1122, the power from the AC terminal is transmitted to the first power resistor R1 and the second power resistor R2 through the bidirectional AC/DC converter 111, the primary switching unit 1121 and the transformer 1122 to make the first power resistor R1 and the second power resistor R2 generate heat energy to warm the EV or the PHEV.

In one embodiment, in the temperature conditioning mode, the controller 2 controls the first relay K1 and the second relay K2 to be on. so that the first power resistor R1 and the second power resistor R2 are coupled to the power conversion device 11 through the first relay K1 and the second relay K2, and by controlling the secondary switching unit 1123, the power from the high voltage battery pack 32 is transmitted to the first resistor and the second resistor through the secondary switching unit 1123 to make the first power resistor R1 and the second power resistor R2 generate heat energy to condition the temperature of the EV or the PHEV.

In one embodiment, in the charging mode, the controller 2 controls the first relay K1 and the second relay K2 to be off. so that the first power resistor R1 and the second power resistor R2 are cut off from the on board charge module 1, the controller 2 controls the bidirectional AC/DC converter 111 and the bidirectional DC/DC converter 112 to transform the power from the AC terminal to an output power to charge the high voltage battery pack 32.

In the embodiment as shown in FIG. 8B and in the embodiment as shown in FIG. 9B, the electrothermal element 13 includes two power resistors (the first power resistor R1 and the second power resistor R2). The first power resistor R1 is coupled between the first output terminal of the switching unit 12 and the ground, and the second power resistor R2 is coupled between the second output terminal of the switching unit 12 and the ground. Embodiments of the disclosures are not limited thereto. In other embodiment, the electrothermal element 13 includes one power resistor R, one terminal of the power resistor R is coupled to the first output terminal and the second output terminal of the switching unit 12, and the other terminal of the power resistor R is coupled to the ground.

Figure 10:
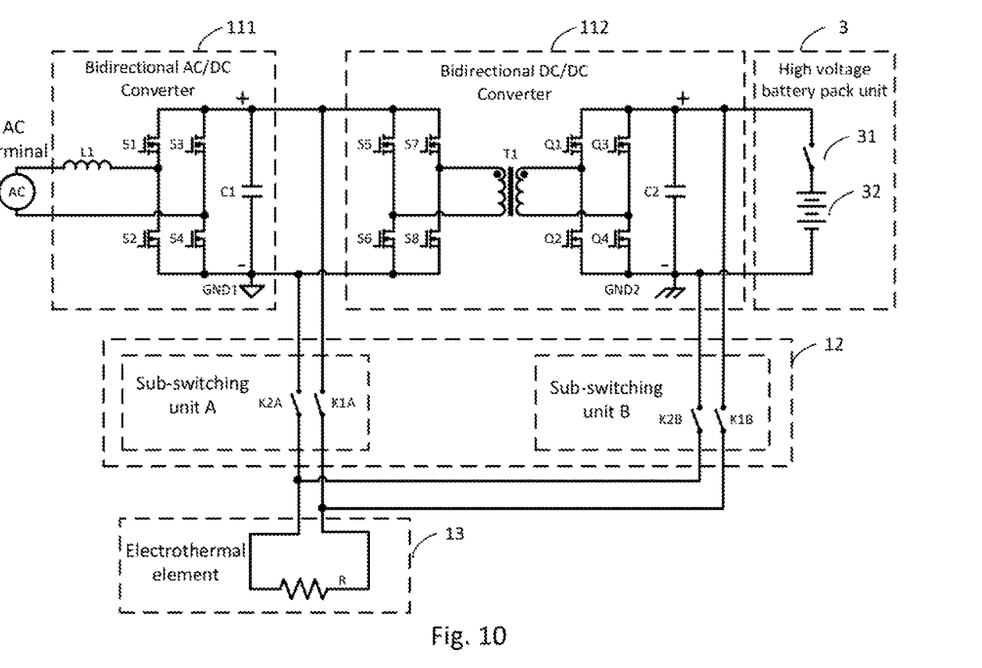
FIG. 10 shows a schematic diagram of a battery charge system according to one embodiment of this disclosure.

FIG. 10 shows a schematic diagram of a battery charge system according to one embodiment of this disclosure. As shown in FIG. 10, The switching unit 12 includes a sub-switching unit A and a sub-switching unit B. The sub-switching unit A is coupled to the output terminal of the bidirectional AC/DC converter 111, and the sub-switching unit B is coupled to the output terminal of the bidirectional DC/DC converter 112. Specially, the first input terminal and the second input terminal of the sub-switching unit A are coupled to the positive output terminal and the negative output terminal of the bidirectional AC/DC converter 111 respectively. the first input terminal and the second input terminal of the sub-switching unit B are coupled to the positive output terminal and the negative output terminal of the bidirectional DC/DC converter 112 respectively. The electrothermal element 13 is coupled between the first output terminal and the second output terminal of the sub-switching unit A. and the electrothermal element 13 is also coupled between the first output terminal and the second output terminal of the sub-switching unit B.

In one embodiment, in the preheating mode, the controller 2 controls the first switching element 31 and the sub-switching unit A to be off, and controls the sub-switching unit B on. And by controlling the bidirectional AC/DC converter 111 and the bidirectional DC/DC converter 112, the power from the AC terminal is transmitted to the electrothermal element 13 through the bidirectional AC/DC converter 111 and the bidirectional DC/DC converter 112 to make electrothermal element 13 generate heat energy to warm the EV or PHEV.

In one embodiment, in the temperature conditioning mode, the controller 2 controls the first switching element 31 and the sub-switching unit A to be on, and controls the sub-switching unit B to be off, And by controlling the bidirectional DC/DC converter 112, the power from the high voltage battery pack 32 is transmitted to the electrothermal element 13 through the bidirectional DC/DC converter 112 to make electrothermal element 13 generate heat energy thereof to condition the temperature of the EV or the PHEV.

In one embodiment, in the charging mode, the controller 2 controls the first switching element 31 to be on, and controls the sub-switching unit A and the sub-switching unit B to be off, the controller 2 controls the bidirectional AC/DC converter 111 and the bidirectional DC/DC converter 112 to transform the power from AC terminal to an output power to charge the high voltage battery pack 32.

In the embodiment as shown in FIG. 10, in the preheating mode, the power from the AC terminal is transmitted to the electrothermal element 13 by the bidirectional AC/DC converter 111 and the bidirectional DC/DC converter 112. In the temperature conditioning mode, the power from the high voltage battery pack 32 is transmitted to the electrothermal element 13 by the bidirectional DC/DC converter 112. That is, less converter is needed in the transmission path, so lower loss and higher efficiency battery charge system is achieved. And as shown in the embodiment, it doesn't need an additional special PWM DC/DC converter and a controller correspondingly to control it. so reducing the cost of the battery charge system significantly and making the design of the battery charge system easier.

As shown in FIG. 10, the sub-switching unit A is coupled to the output terminal of the bidirectional AC/DC converter 111, and the sub-switching unit B is coupled to the output terminal of the bidirectional DC/DC converter 112. Embodiments of this disclosure are not limited thereto. In one embodiment, the sub-switching unit A is coupled to the output terminal of the bidirectional AC/DC converter 111, the two terminals of the primary winding of the transformer 1122 or the two terminals of the secondary winding of the transformer 1122. and the sub-switching unit B is coupled to the output terminal of the bidirectional DC/DC converter 112, the two terminals of the primary winding of the transformer 1122 or the two terminals of the secondary winding of the transformer 1122.

As shown in FIG. 10, in the preheating mode, the controller 2 controls the sub-switching unit A to be off, and controls the sub-switching unit B to be on, in the temperature conditioning mode, the controller 2 controls the sub-switching unit A to be on, and controls the sub-switching unit B to be off. Embodiments of this disclosure are not limited thereto. In one embodiment, in the preheating mode and in the temperature conditioning mode, the controller 2 may controls the sub-switching unit B to be on or off, and controls the sub-switching unit A to be off or on accordingly, or the controller 2 controls the sub-switching unit A and the sub-switching unit B to be on simultaneously according to actual application. Embodiments of this disclosure are not limited thereto. As long as in the preheating mode and in the temperature conditioning mode, the power conversion device 11 can work to output the output power, and electrothermal element 13 receives the output power and converts the output power into heat energy.

Figure 11A:
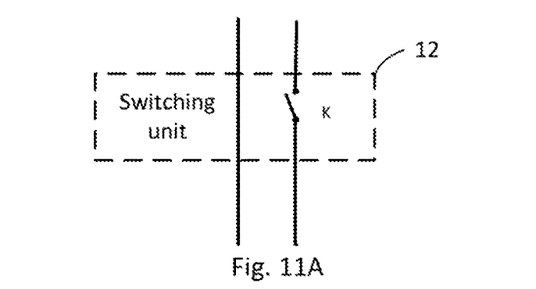
FIG. 11A shows a schematic diagram of a switching unit according to one embodiment of this disclosure.
Figure 11B:
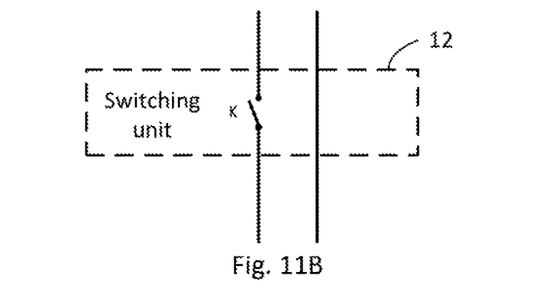
FIG. 11B shows a schematic diagram of a switching unit according to another embodiment of this disclosure.

In the embodiment, the switching unit 12 shown in FIG. 6A, FIG. 8A and FIG. 9A, and the sub-switching unit A and the sub-switching unit B shown in FIG. 10, includes the first relay K1 coupled between the first input terminal and the first output terminal, and the second relay K2 coupled between the second input terminal and the second output terminal. Embodiments of this disclosure are not limited thereto. In one embodiment, as shown in FIG. 11A, the switching unit 12 can only include a relay coupled between the first input terminal and the first output terminal. In one embodiment, as shown in FIG. 11B, the switching unit 12 can only include a relay coupled between the second input terminal and the second output terminal.

Figure 12A:
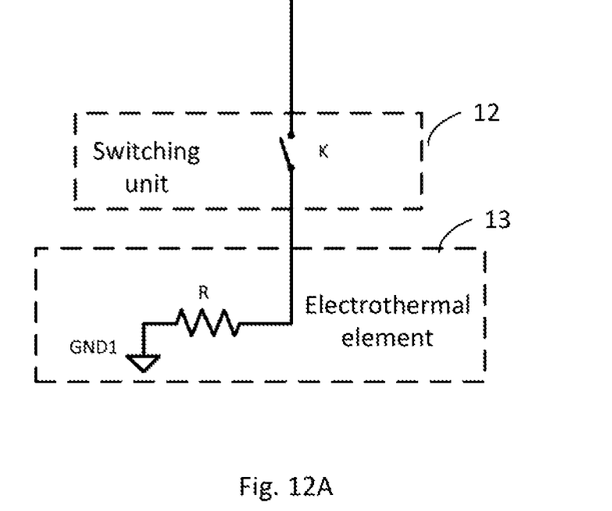
FIG. 12A shows a schematic diagram of a switching unit and an electrothermal element according to one embodiment of this disclosure.
Figure 12B:
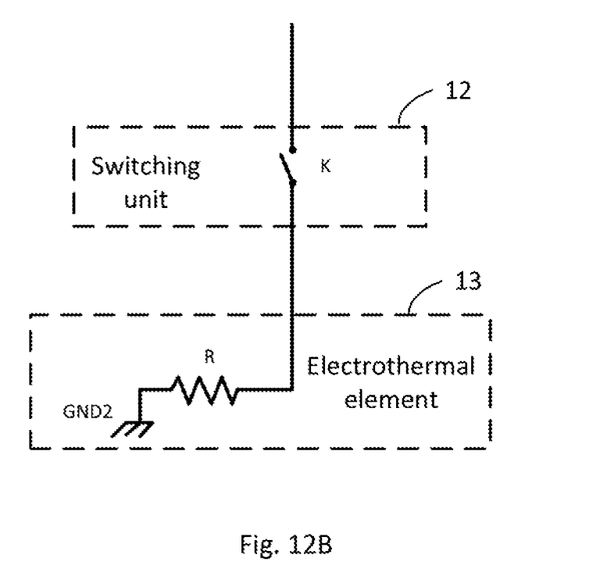
FIG. 12B shows a schematic diagram of a switching unit and an electrothermal element according to one embodiment of this disclosure.

In one embodiment, as shown in FIG. 8B and, FIG. 9B, the on board charge module 1 includes two heat generating branches. However, in other embodiment, the on board charge module 1 can include only one heat generating branch. As shown in FIG. 12A and, FIG. 12B, the switching unit 12 includes an input terminal, an output terminal and a relay coupled there between. The electrothermal element 13 includes a power resistor R. As shown in FIG. 12A, the first terminal of the power resistor R is coupled to the output terminal of the switching unit 12, the second terminal of the power resistor R is coupled to the primary ground GND1, the input terminal of the switching unit 12 is coupled to the first terminal or the second terminal of the primary winding of the transformer 1122. In another embodiment, the input terminal of the switching unit 12 can be coupled to the positive output terminal of the bidirectional AC/DC converter 111. As shown in FIG. 12B, the first terminal of the power resistor R is coupled to the output terminal of the switching unit 12, the second terminal of the power resistor R is coupled to the secondary ground GND2, the input terminal of the switching unit 12 is coupled to the first terminal or the second terminal of the secondary winding of the transformer 1122. In another embodiment, the input terminal of the switching unit 12 can be coupled to the positive output terminal of the bidirectional DC/DC converter 112.

Figure 12C:
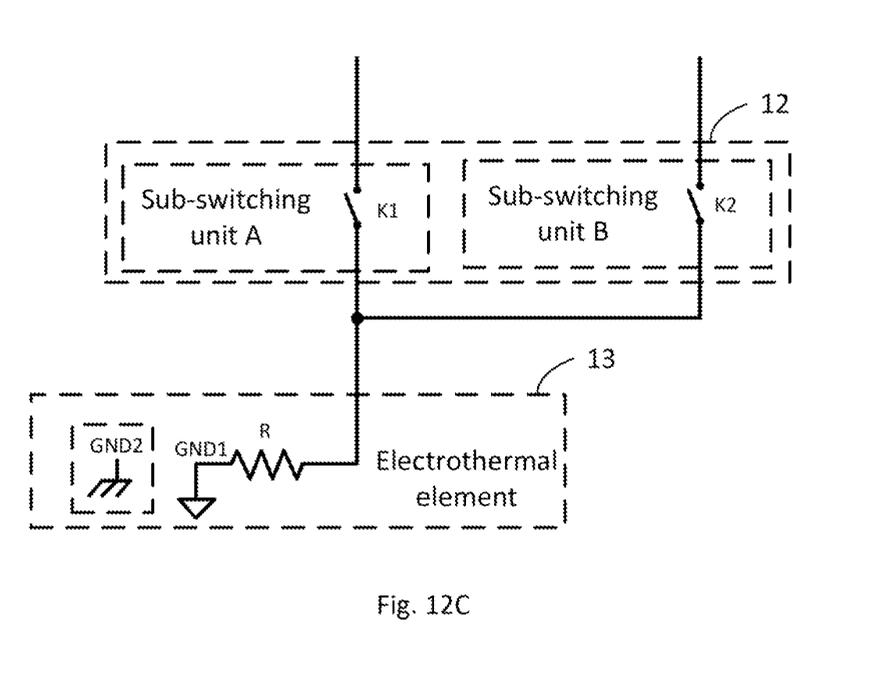
FIG. 12C shows a schematic diagram of a switching unit and an electrothermal element according to one embodiment of this disclosure.

In one embodiment, as shown in FIG. 12C, The switching unit 12 includes the sub-switching unit A and sub-switching unit B, each sub-switching unit includes an input terminal, an output terminal and a relay coupled there between. The output terminal of the sub-switching unit A and the output terminal of the sub-switching unit B are coupled to the first terminal of the power resistor R, the second terminal of the power resistor R is coupled to the primary ground GND1 or the secondary ground GND2, the input terminal of the sub-switching unit A and the input terminal of the sub-switching unit B are coupled to the power conversion device 11. For example, the input terminal of the sub-switching unit A is coupled to any one of the positive output terminal of the bidirectional AC/DC converter 111, the first terminal of the primary winding of the transformer 1122, the second terminal of the primary winding of the transformer 1122, the first terminal of the secondary winding of the transformer 1122 and the second terminal of the secondary winding of the transformer 1122. And, for example, the input terminal of the sub-switching unit B is coupled to any one of the positive output terminal of the bidirectional DC/DC converter 112.

the first terminal of the primary winding of the transformer 1122, the second terminal of the primary winding of the transformer 1122, the first terminal of the secondary winding of the transformer 1122 and the second terminal of the secondary winding of the transformer 1122.

The relay as shown in the above embodiment can be other kinds of switch, such as NMOS, PMOS or IGBT, and the switch may include only a switch, or plurality switches connected in series or parallel. Embodiments of this disclosure are not limited thereto, as long as the switch can be controlled to be on or off.

The electrothermal element 13 as shown in the above embodiment only include a PTC power resistor R. Embodiment of this disclosure are not limited thereto. In other embodiment, the electrothermal element 13 can be any type of element which can converts electric energy to heat energy. And, in one embodiment, the electrothermal element 13 can include plurality elements which can converts electric energy to heat energy connected in series or parallel. in the disclosure of this application, the type, the number and the connecting relationship of the electrothermal element not limited, as long as the electrothermal element can converts electric energy to heat energy.

The AC terminal as shown in the above embodiment can be AC power grid, UPS or AC load, embodiment of this disclosure are not limited thereto.

As shown in the above embodiment, in the preheating mode, the temperature conditioning mode and the charging mode, only the power conversion device in the on board charge module are needed. That is, less converter is needed in the transmission path, so lower loss and higher efficiency battery charge system is achieved. And as shown in the above embodiment, it doesn't need an additional special PWM DC/DC converter and a controller correspondingly to control it, so reducing the cost of the battery charge system significantly and making the design of the battery charge system easier.

The term "coupled" means at least either a direct electrical connection between the connected items or an indirect connection through one or more passive or active intermediary devices. The term "circuit" means at least either a single component or a multiplicity of components, either active and/or passive, that are coupled together to provide a desired function.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A battery charge system, comprising:
an on board charge module, comprising:
a power conversion device, comprising an alternating current (AC)/direct current (DC) converter and a bidirectional DC/DC converter, wherein an input terminal of the AC/DC converter is coupled to an AC terminal, and an output terminal of the AC/DC converter is coupled to an input terminal of the bidirectional DC/DC converter;
a switching unit, coupling to the power conversion device; and
an electrothermal element, coupling to the switching unit;
a high voltage battery pack unit, comprising a first switching element and a high voltage battery pack, wherein the high voltage battery pack is coupled through the first switching element to an output terminal of the bidirectional DC/DC converter; and
a controller, coupling to the power conversion device and the switching unit, and configured to control the power conversion device and the switching unit,
wherein the AC/DC converter comprises a positive output terminal, the bidirectional DC/DC converter comprises a positive output terminal and a transformer, the transformer comprises a primary winding and a secondary winding, the switching unit comprises a sub-switching unit A and a sub-switching unit B, each of the sub-switching unit A and the sub-switching unit B comprises an input terminal and an output terminal, the output terminal of the sub-switching unit A and the output terminal of the sub-switching unit B are coupled to a terminal of the electrothermal element, the input terminal of the sub-switching unit A is coupled to any one of the positive output terminal of the AC/DC converter, a first terminal of the primary winding, a second terminal of the primary winding, a first terminal of the secondary winding and a second terminal of the secondary winding; and the input terminal of the sub-switching unit B is coupled to any one of the positive output terminal of the bidirectional DC/DC converter, the first terminal of the primary winding, the second terminal of the primary winding, the first terminal of the secondary winding and the second terminal of the secondary winding.

2. The battery charge system of claim 1, wherein the controller is configured to control the on board charge module to work in a preheating mode or in a temperature conditioning mode, wherein during the preheating mode or the temperature conditioning mode, the controller controls the switching unit to be on, so that the electrothermal element is coupled to the power conversion device through the switching unit, and converts an output power from the power conversion device into heat energy.

3. The battery charge system of claim 2, wherein in the preheating mode, the controller controls the first switching element to be off and the switching unit to be on.

4. The battery charge system of claim 2, wherein in the temperature conditioning mode, the controller controls the first switching element and the switching unit to be on.

5. The battery charge system of claim 1, wherein the switching unit comprises a first input terminal, a first output terminal, a second input terminal and a second output terminal, at least one switch is coupled between the first input terminal and the first output terminal, and/or at least one switch is coupled between the second input terminal and the second output terminal.

6. The battery charge system of claim 5, wherein the switching unit is coupled to the bidirectional DC/DC converter.

7. The battery charge system of claim 6, wherein the bidirectional DC/DC converter comprises a primary switching unit and a secondary switching unit, the primary switching unit is coupled to two terminals of a primary winding of the transformer, the secondary switching unit is coupled to two terminals of a secondary winding of the transformer, the first input terminal of the switching unit is coupled to a first terminal of the two terminals of the secondary winding of the transformer, the second input terminal of the switching unit is coupled to a second terminal of the two terminals of the secondary winding of the transformer.

8. The battery charge system of claim 6, wherein the bidirectional DC/DC converter comprises a primary switching unit, a transformer and a secondary switching unit, the primary switching unit is coupled to two terminals of primary winding of the transformer, the secondary switching unit is coupled to two terminals of secondary winding of the transformer, the first input terminal of the switching unit is coupled to a first terminal of the two terminals of the primary winding of the transformer, the second input terminal of the switching unit is coupled to a second terminal of the two terminals of the primary winding of the transformer.

9. The battery charge system of claim 5, wherein the AC/DC converter further comprises a negative output terminal, the first input terminal of the switching unit is coupled to the positive output terminal, and the second input terminal of the switching unit is coupled to the negative output terminal.

10. The battery charge system of claim 7, wherein the electrothermal element is coupled between the first output terminal of the switching unit and the second output terminal of the switching unit; or, the electrothermal element is coupled between the first output terminal of the switching unit and secondary ground of the power conversion device and/or between the second output terminal of the switching unit and the secondary ground of the power conversion device.

11. The battery charge system of claim 8, wherein the electrothermal element is coupled between the first output terminal of the switching unit and the second output terminal of the switching unit; or, the electrothermal element is coupled between the first output terminal of the switching unit and primary ground of the power conversion device and/or between the second output terminal of the switching unit and the primary ground of the power conversion device.

12. The battery charge system of claim 9, wherein the electrothermal element is coupled between the first output terminal of the switching unit and the second output terminal of the switching unit; or, the electrothermal element is coupled between the first output terminal of the switching unit and the primary ground of the power conversion device and/or between the second output terminal of the switching unit and the primary ground of the power conversion device.

13. The battery charge system of claim 1, wherein the switching unit comprises an input terminal and an output terminal, at least one switch is coupled between the input terminal and the output terminal, and the output terminal of the switching unit is coupled to a terminal of the electrothermal element.

14. The battery charge system of claim 13, wherein the input terminal of the switching unit is coupled to any one of a positive output terminal of the bidirectional DC/DC converter, a first terminal of the primary winding, a second terminal of the primary winding, a first terminal of the secondary winding and a second terminal of the secondary winding.

15. The battery charge system of claim 1, wherein the electrothermal element comprises at least one positive temperature coefficient (PTC) power resistor.

* * * * *